United States Patent [19]

(12) United States Patent
Jang et al.

(10) Patent No.: US 12,363,304 B2
(45) Date of Patent: *Jul. 15, 2025

(54) METHOD FOR CODING IMAGE ON BASIS OF DEBLOCKING FILTERING, AND APPARATUS THEREFOR

(71) Applicant: BEIJING XIAOMI MOBILE SOFTWARE CO., LTD., Beijing (CN)

(72) Inventors: Hyeongmoon Jang, Seoul (KR); Jaehyun Lim, Seoul (KR); Junghak Nam, Seoul (KR)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/647,633

(22) Filed: Apr. 26, 2024

(65) Prior Publication Data
US 2024/0275978 A1 Aug. 15, 2024

Related U.S. Application Data

(63) Continuation of application No. 17/899,834, filed on Aug. 31, 2022, now Pat. No. 11,991,362, which is a continuation of application No. 17/572,329, filed on Jan. 10, 2022, now Pat. No. 11,470,325, which is a continuation of application No. PCT/KR2020/008984, filed on Jul. 9, 2020.

(60) Provisional application No. 62/871,731, filed on Jul. 9, 2019.

(51) Int. Cl.
H04N 19/132 (2014.01)
H04N 19/117 (2014.01)
(Continued)

(52) U.S. Cl.
CPC ......... *H04N 19/132* (2014.11); *H04N 19/117* (2014.11); *H04N 19/159* (2014.11);
(Continued)

(58) Field of Classification Search
CPC ...... H04N 19/46; H04N 19/82; H04N 19/117; H04N 19/132; H04N 19/159; H04N 19/176; H04N 19/186
See application file for complete search history.

(56) References Cited

U.S. PATENT DOCUMENTS

2020/0213596 A1* 7/2020 Xu ................. H04N 19/105
2020/0275121 A1* 8/2020 Zhao ............... H04N 19/70

FOREIGN PATENT DOCUMENTS

TW 202112132 A * 3/2021 ........... H04N 19/105

OTHER PUBLICATIONS

Benjamin Bross et al., "Versatile Video Coding (Draft 5)", Joint Video experts Team (JVET) of ITU-T SG 16 WP 3 and ISO/IEC JTC 1/SC 29/WG 11, 14th Meeting: Geneva, CH, Mar. 19-27, 2019. JVET-N1001 (Year: 2019).*

(Continued)

Primary Examiner — Dave Czekaj
Assistant Examiner — Shanika M Brumfield
(74) Attorney, Agent, or Firm — Cozen O'Connor

(57) ABSTRACT

A method for decoding an image, according to the present document, comprises: receiving a bitstream including BDPCM information; deriving residual samples for a current block on the basis of the BDPCM information; deriving prediction samples for the current block on the basis of the BDPCM information; generating a reconstructed picture on the basis of the residual samples and the prediction samples; and performing deblocking filtering on the reconstructed picture, wherein when BDPCM is applied to the current block, the deblocking filtering is not performed.

10 Claims, 9 Drawing Sheets

(51) Int. Cl.
  *H04N 19/159* (2014.01)
  *H04N 19/176* (2014.01)
  *H04N 19/186* (2014.01)
  *H04N 19/46* (2014.01)
  *H04N 19/82* (2014.01)

(52) U.S. Cl.
  CPC ......... *H04N 19/176* (2014.11); *H04N 19/186* (2014.11); *H04N 19/46* (2014.11); *H04N 19/82* (2014.11)

(56) References Cited

OTHER PUBLICATIONS

Hyeongmun Jang et al., "Non-CE5: Deblock filtering process for BDPCM bloc", Joint Video Experts Team (JVET) of ITU-T SG 16 WP 3 and ISO/IEC JTC 1/SC 29/WG 11, JVET-O0582, Jul. 2019, 9 pages.

Hyeongmun Jang, "Non-CE5: Deblock filtering process for BDPCM block", power point for presentation for JVET-O0582, Jul. 2019, 9 pages.

Jianle Chen et al., "Algorithm description for Versatile Video Coding and Test Model 5 (VTM 5)", Joint Video Experts Team (JVET) of ITU-T SG16WP3 and ISO/IEC JTC1/SC 29/WG 11, JVET-N1002-v2, Mar. 2019, 76 pages.

Marta Karczewicz et al., "CE8-related: Quantized residual BDPCM", Joint Video Experts Team (JVET) of ITU-T SG 16 WP 3 and ISO/IEC JTC 1/SC 29/WG 11, JVET-N0413, Mar. 2019, 5 pages.

Mohsen Abdoli et al., "CE8:BDPCM with horizontal/vertical predictor and independently decodable areas (test 8.3.1b)", Joint Video Experts Team (JVET) of ITU-T SG 16 WP 3 and ISO/IEC JTC 1/SC 29/WG 11, JVET-M0057, Jan. 2019, 7 pages.

Japanese patent application 2022-500851 Office Action dated Nov. 19, 2024 with English translation 27 pages.

* cited by examiner

BS 1 or 0

BS 1 or 0

BS 1 or 0

BS 0

BS 0

BS 0

BS 2

BS 2

BS 2

METHOD FOR CODING IMAGE ON BASIS OF DEBLOCKING FILTERING, AND APPARATUS THEREFOR

This is a Continuation Application of U.S. patent application Ser. No. 17/899,834, filed on Aug. 31, 2022, which is a Continuation Application of U.S. patent application Ser. No. 17/572,329, filed on Jan. 10, 2022, now U.S. Pat. No. 11,470,325, which is a Bypass Continuation of PCT Application No. PCT/KR2020/008984, with an international filing date of Jul. 9, 2020, which claims the benefit of U.S. Provisional Application No. 62/871,731, filed on Jul. 9, 2019, all of which are incorporated by reference in their entirety herein.

BACKGROUND OF THE DISCLOSURE

Field of the Disclosure

The present disclosure relates to a video coding technique and, more particularly, to a video coding method based on deblocking filtering in a video coding system and the apparatus for the same.

Related Art

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

The present disclosure also provides a method and apparatus for increasing efficiency of transform index coding in video coding based on deblocking filtering.

The present disclosure also provides a method and apparatus for deblocking filtering for a video which is coded based on a BDPCM.

The present disclosure also provides a video coding method and apparatus for a chroma component which is coded based on a BDPCM.

In an aspect, a video decoding method performed by a decoding apparatus is provided. The method may include receiving a bitstream including BDPCM (block differential pulse coded modulation or Block-based Delta Pulse Code Modulation) information; deriving residual samples for a current block based on the BDPCM information; deriving prediction samples for the current block based on the BDPCM information; generating a reconstructed picture based on the residual sample and the prediction sample; performing deblocking filtering on the reconstructed picture, wherein, when a BDPCM is applied to the current block, the deblocking filtering may not be performed.

The BDPCM information may include flag information that indicates whether the BDPCM is applied to the current block, and when the flag information is 1, a boundary strength (bS) for the deblocking filtering may be derived as zero.

The current block may include a luma coding block or a chroma coding block.

A tree type of the current block may be a single tree type, the current block may be the chroma coding block, and when the flag information is 1, the boundary strength may be derived as 1.

The step of deriving the residual samples may include deriving a quantized transform coefficient for the current block based on the BDPCM; and deriving a transform coefficient by performing dequantization of the quantized transform coefficient.

The quantized transform coefficient may be derived based on directional information for a direction in which the BDPCM is performed.

An intra prediction sample for the current block may be derived based on a direction in which the BDPCM is performed.

In another aspect, a video encoding method performed by an encoding apparatus is provided. The method may include deriving prediction samples for a current block based on a BDPCM (block differential pulse coded modulation or Block-based Delta Pulse Code Modulation); deriving residual samples for the current block based on the prediction samples; generating a reconstructed picture based on the residual sample and the prediction sample; performing deblocking filtering on the reconstructed picture; deriving quantized residual information for a current block based on the BDPCM; and encoding the quantized residual information and BDPCM information for the BDPCM, wherein, when the BDPCM is applied to the current block, the deblocking filtering may not be performed.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

Advantageous Effects

According to the present disclosure, it is possible to increase overall image/video compression efficiency.

According to the present disclosure, the efficiency of deblocking filtering in video coding based on a BDPCM may be increased.

According to the present disclosure, the efficiency of deblocking filtering of a chroma image based on a BDPCM may be increased.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

DESCRIPTION OF EXEMPLARY EMBODIMENTS

Figure 1:
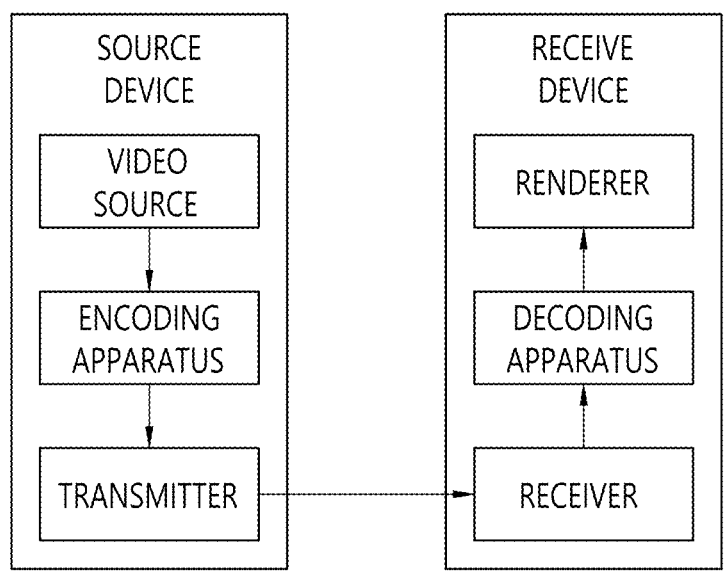
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
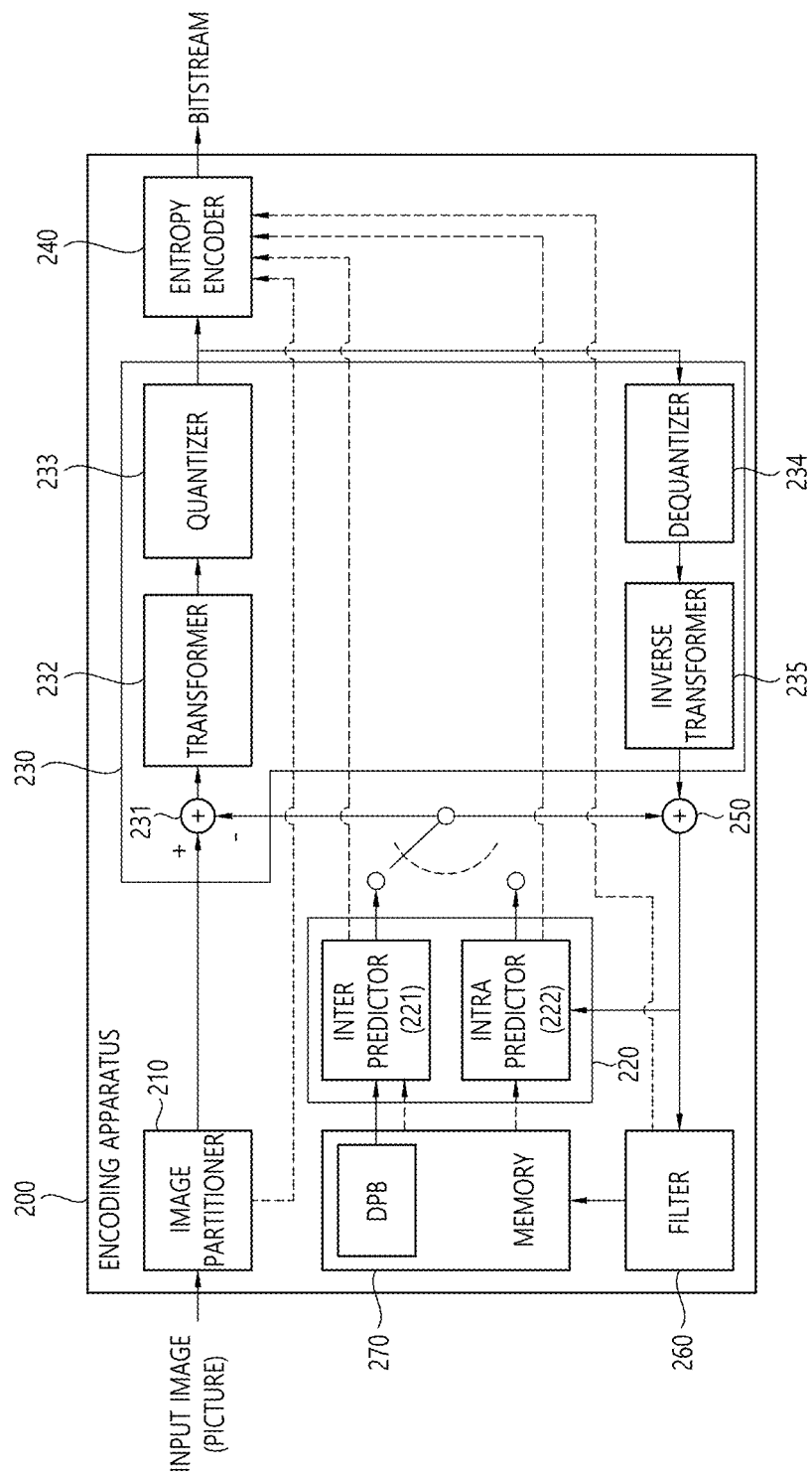
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the predictor 220 from an input image signal (original block, original sample array) to generate a residual signal (residual block, residual sample array), and the generated residual signal is transmitted to the transformer 232. The predictor 220 may perform prediction on a processing target block (hereinafter, referred to as 'current block'), and may generate a predicted block including prediction samples for the current block. The predictor 220 may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
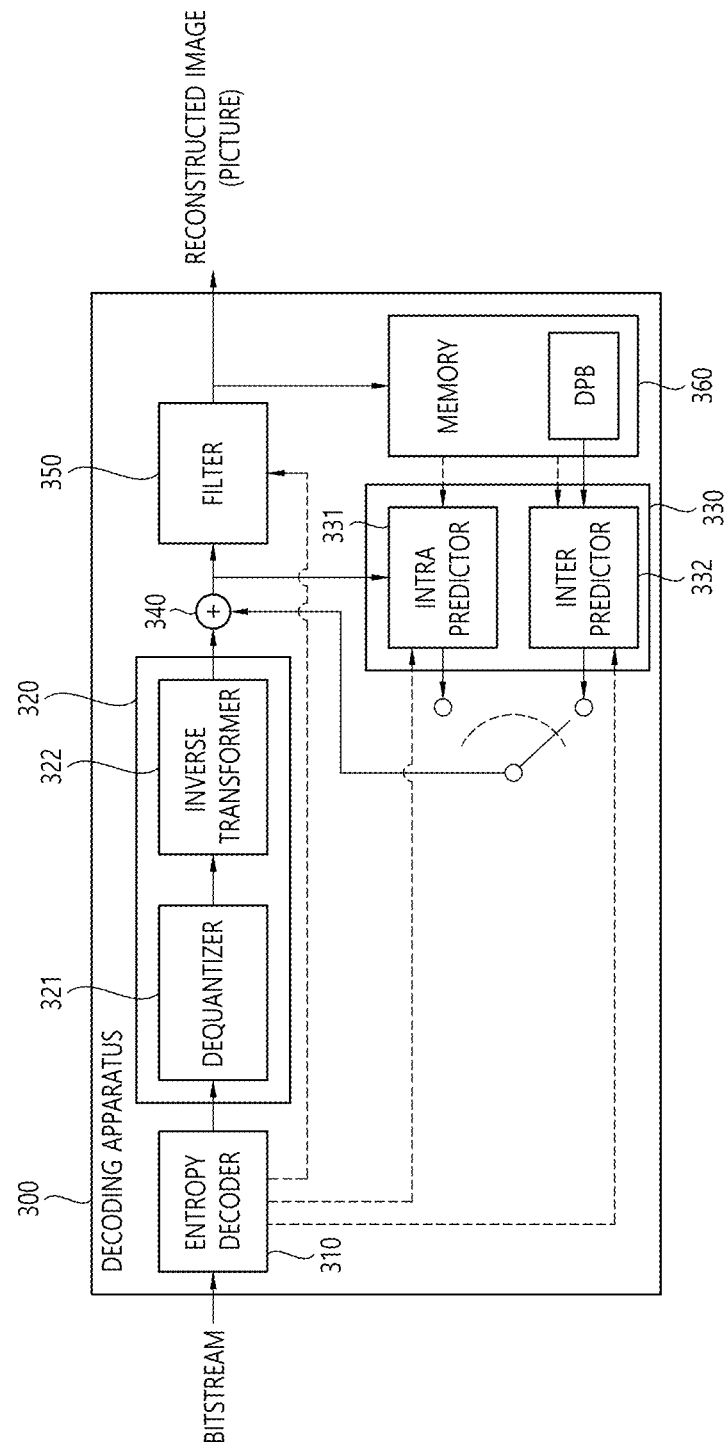
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The dequantizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Meanwhile, according to an embodiment, a block differential pulse coded modulation or Block-based Delta Pulse Code Modulation (BDPCM) technique may be used. The BDPCM may also be referred to as a quantized Residual block-based Delta Pulse Code Modulation (RDPCM).

In the case of predicting a block by applying the BDPCM, reconstructed samples are utilized to predict a row or a column of a block in a line by line manner. In this case, a used reference pixel may be unfiltered samples. A BDPCM direction may represent whether a prediction of a vertical direction or horizontal direction is used. A prediction error may be quantized in a spatial domain, and a pixel may be reconstructed by adding a dequantized prediction error to a prediction. As an alternative of the BDPCM, a quantized residual domain BDPCM may be proposed, and a prediction direction or a signaling thereof may be the same as the BDPCM which has been applied to the spatial domain. In other words, quantized coefficients are stacked through a quantized residual domain BDPCM like in a Delta Pulse Code Modulation (DPCM), and then, a residual may be reconstructed through dequantization. Accordingly, the quantized residual domain BDPCM may be used in the meaning that the DPCM is applied in a residual coding end.

Hereinafter, in the quantized residual domain used below, a residual derived based on a prediction is quantized without a transform, and the quantized residual domain means a domain for a quantized residual sample.

For a block of size M (rows)×N (columns), let $r_{i,j}$, $0 \leq i \leq M-1$, $0 \leq j \leq N-1$ be a prediction residual after performing an intra prediction horizontally (copying left neighbor pixel value across the predicted block line by line) or vertically (copying top neighbor line to each line in the predicted block) using unfiltered samples from above or left block boundary samples. Further, let $Q(r_{i,j})$, $0 \leq i \leq M-1$, $0 \leq j \leq N-1$ denote a quantized version of the residual $r_{i,j}$. Here, the residual means a difference between an original block and a predicted block value.

Thereafter, when the BDPCM is applied to the quantized residual sample, a modified M×N array $\check{R}$ with elements $\tilde{r}_{i,j}$ is derived.

When a vertical BDPCM is signaled, $\tilde{r}_{i,j}$ is as represented in the Equation below.

$$\tilde{r}_{i,j} = \begin{cases} Q(r_{i,j}), & i=0, 0 \leq j \leq (N-1) \\ Q(r_{i,j}) - Q(r_{(i-1),j}), & 1 \leq i \leq (M-1), 0 \leq j \leq (N-1) \end{cases}$$ [Equation 1]

For a horizontal prediction, when a similar rule is applied, the residual quantized sample is as represented in the Equation below.

$$\tilde{r}_{i,j} = \begin{cases} Q(r_{i,j}), & 0 \leq i \leq (M-1), j=0 \\ Q(r_{i,j}) - Q(r_{i,(j-1)}), & 0 \leq i \leq (M-1), 1 \leq j \leq (N-1) \end{cases}$$ [Equation 2]

The residual quantized sample $\tilde{r}_{i,j}$ is transmitted to the decoding apparatus.

In the decoding apparatus, the above calculations are reversed to produce $Q(r_{i,j})$, $0 \leq i \leq M-1$, $0 \leq j \leq N-1$.

For a vertical prediction, the following equation may be applied.

$$Q(r_{i,j}) = \sum_{k=0}^{i} \tilde{r}_{k,j}, 0 \leq i \leq (M-1), 0 \leq j \leq (N-1)$$ [Equation 3]

In addition, for a horizontal prediction, the following equation may be applied.

$$(r_{i,j}) = \sum_{k=0}^{j} \tilde{r}_{i,k}, 0 \leq i \leq (M-1), 0 \leq j \leq (N-1)$$ [Equation 4]

The inverse quantized residual $Q^{-1}(Q(r_{i,j}))$ is added to the intra block prediction value to produce the reconstructed sample value.

The main benefit of this scheme is that the inverse BDPCM may be performed by simply adding the predictor instantaneously in parsing the coefficient or after parsing during coefficient parsing.

As described above, the BDPCM may be applied to the quantized residual domain, and the quantized residual domain may include a quantized residual (or quantized residual coefficient). In this case, a transform skip may be applied to the residual. That is, for the residual sample, a transform may be skipped, but a quantization may be performed. Alternatively, the quantized residual domain may also include a quantized transform coefficient. A flag on whether the BDPCM is applicable may be signaled in a sequence level (SPS), and the flag may be signaled only when it is signaled that the transform skip mode is available in SPS.

In applying the BDPCM, an intra prediction for the quantized residual domain may be performed for the entire block by the sample copy in a prediction direction (e.g., vertical prediction or horizontal prediction) similar to the intra prediction direction. The residual is quantized, and a delta value between the quantized residual and the predictor for a vertical or horizontal direction (i.e., quantized residual in the horizontal or vertical direction), that is, a differential value $\tilde{r}_{i,j}$ is coded.

When a CU is coded in an intra prediction, the flag information indicating whether the BDPCM is applicable may be transmitted in a CU level. That is, the flag information indicates whether the conventional intra coding is applied or BDPCM is applied. When the BDPCM is applied, a BDPCM prediction direction flag indicating whether a prediction direction is a horizontal direction or vertical direction may be transmitted. Then, the block is predicted through the conventional horizontal or vertical intra prediction procedure using the unfiltered reference sample. The residual is quantized, and a difference value between each quantized residual and the predictor, for example, a quantized residual which is already quantized in a neighboring position in a horizontal or vertical direction along the BDPCM prediction direction is coded.

In the case that the BDPCM is applicable, when a CU size is equal to or the same as MaxTsSize (maximum transform skip size) for a luma sample, and when a CU is coded in an intra prediction, the flag information may be transmitted in a CU level. Here, MaxTsSize means a maximum block size for which the transform skip mode is allowed.

The syntax elements and the semantics therefor for the description above are represented in the following table as below.

TABLE 1

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA && | |
|       !( cbWidth = = 4 && cbHeight = = 4 && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|       && !( cbWidth = = 4 && cbHeight = = 4 ) ) | |
|       pred_mode_flag | ae(v) |
|     if( ( (slice_type = = I && cu_skip_flag[ x0 ][ y0 ] = =0 ) \|\| | |
|       ( slice_type = I && ( CuPredMode[ x0 ][ y0 ] != MODE_INTRA \|\| | |
|       ( cbWidth = = 4 && cbHeight = = 4 && cu_skip_flag[ x0 ][ y0 ] = = 0 ) ) ) ) && | |
|       sps_ibc_enabled_flag && ( cbWidth != 128 \|\| cbHeight != 128 ) ) | |
|       pred_mode_ibc_flag | ae(v) |
|   } | |
|   ... | |
|   if( treeType = = SINGLE_TREE \|\| treeType = = DUAL_TREE_LUMA ) { | |
|     if( cbWidth <= 32 && cbHeight <= 32 ) | |
|       intra_bdpcm_flag[ x0 ][ y0 ] | ae(v) |
|     if( intra_bdpcm_flag[ x0 ][ y0 ] ) | |
|       intra_bdpcm_dir_flag[ x0 ][ y0 ] | ae(v) |
| ... | |

TABLE 2 intra_bdpcm_flag[ x0 ][ y0 ] equal to 1 specifies that BDPCM is applied to the current luma coding block at the location ( x0, y0 ), i.e. the transform is skipped, the intra luma prediction mode is specified by intra_bdpcm_dir_flag[ x0 ][ y0 ]. intra_bdpcm_dir_flag[ x0 ][ y0 ] equal to 0 specifies that BDPCM is not applied to the current luma coding block at the location ( x0, y0 ).
When intra_bdpcm_flag[ x0 ][ y0 ] is not present it is inferred to be equal to 0.
The variable BdpcmFlag[ x ][ y ] is set equal to intra_bdpcm_flag[ x0 ][ y0 ] for
x = x0..x0 + cbWidth − 1 and y = y0..y0 + cbHeight − 1.
intra_bdpcm_dir_flag[ x0 ][ y0 ] equal to 0 specifies that the BDPCM prediction direction is horizontal. intra_bdpcm_dir_flag[ x0 ][ y0 ] equal to 1 specifies that the BDPCM prediction direction is vertical.
The variable BdpcmDir[ x ][ y ] is set equal to intra_bdpcm_dir_flag[ x0 ][ y0 ] for
x = x0..x0 + cbWidth − 1 and y = y0..y0 + cbHeight − 1.

The syntax element "intra_bdpcm_flag" in Table 1 represents whether the BDPCM is applied to a current luma coding block. When the "intra_bdpcm_flag" value is equal to 1, the transform for the coding block may be skipped, and the prediction mode for the coding block may be configured to a horizontal or vertical direction by "intra_bdpcm_dir_flag" that represents a prediction direction. When the "intra_bdpcm_flag" does not exist, the value is regarded as zero.

In the case that the "intra_bdpcm_dir_flag" representing a prediction direction is zero, the case represents that a BDPCM prediction direction is a horizontal direction, and in the case that the "intra_bdpcm_dir_flag" value is 1, the case represents that a BDPCM prediction direction is a vertical direction.

Meanwhile, as described above, an in-loop filtering procedure may be performed for a reconstructed picture. A modified reconstructed picture may be generated through the in-loop filtering procedure, and the modified reconstructed picture may be output as a decoded picture in the decoding apparatus. In addition, the modified reconstructed picture may be stored in the decoded picture buffer or the memory of the encoding apparatus/decoding apparatus and then, used as a reference picture in an inter prediction procedure in encoding/decoding a picture.

The in-loop filtering procedure may include a deblocking filtering procedure, a sample adaptive offset (SAO) procedure, and/or an adaptive loop filter (ALF) procedure. In this case, one or a part of the deblocking filtering procedure, the sample adaptive offset (SAO) procedure, the adaptive loop filter (ALF) procedure, and a bi-lateral filter procedure may be sequentially applied, or all of them may be sequentially applied. For example, the deblocking filtering procedure may be applied to a reconstructed picture, and then, the SAO procedure may be performed. Alternatively, for example, after the deblocking filtering procedure is applied to a reconstructed picture, the ALF procedure may be performed. This may be performed in the encoding apparatus in the same manner.

The deblocking filtering is a filtering scheme that removes a distortion occurred in a boundary between blocks in a reconstructed picture. According to the deblocking filtering procedure, a target boundary is derived in a reconstructed picture, a boundary strength (bS) for the target boundary is determined, and the deblocking filtering may be performed for the target boundary based on the bS. The bS may be determined based on prediction modes of two block modes adjacent to the target boundary, a motion vector difference, whether a reference picture is the same, the existence of non-zero valid coefficient, and the like.

The SAO is a method for compensating an offset difference between a reconstructed picture and an original picture in a unit of sample and may be applied based on types such as a Band Offset, an Edge Offset, and the like. According to the SAO, samples may be classified into different categories depending on each SAO type, and an offset value may be added to each sample based on the category. The filtering information for the SAO may include information on whether the SAO is applied, SAO type information, SAO offset value information, and the like. The SAO may also be applied to a reconstructed picture after the deblocking filtering is applied.

The adaptive loop filter (ALF) is a filtering scheme in a unit of sample based on filter coefficients according to a filter shape for a reconstructed picture. The encoding apparatus may determine whether the ALF is applied, an ALF shape, and/or an ALF filtering coefficient through a comparison between a reconstructed picture and an original picture and signal the result to the decoding apparatus. That is, the filtering information for the ALF may include information on whether the ALF is applied, ALF shape information, ALF filtering coefficient information, and the like. The ALF may also be applied to a reconstructed picture after the deblocking filtering is applied.

Figure 4:
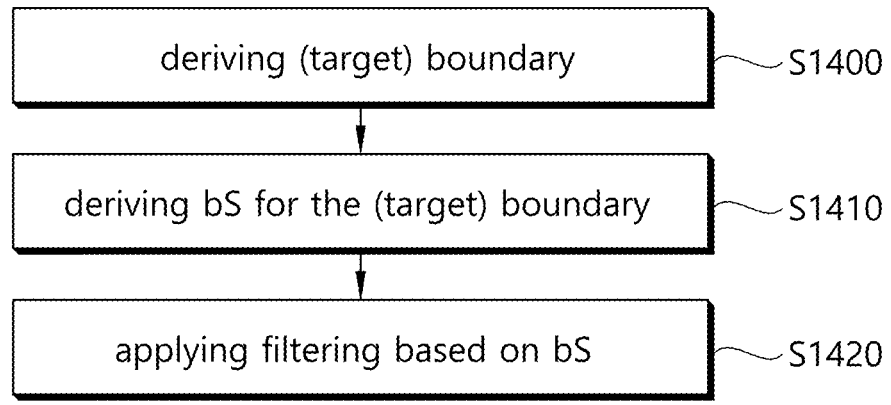
FIG. 4 is a control flowchart for describing a deblocking filtering procedure according to an embodiment.

FIG. 4 is a control flowchart for describing a deblocking filtering procedure according to an embodiment.

Deblocking filtering is applied to a reconstructed picture. Deblocking filtering is performed for each CU of the reconstructed picture in the same order of a decoding process. First, a vertical edge is filtered (horizontal filtering), and then, a horizontal edge is filtered (vertical filtering). Deblocking filtering may be applied to edges of all coding blocks or subblocks and edges of transform blocks of a picture. An output for deblocking filtering may be referred to as a modified reconstructed picture or a modified reconstructed sample/sample array.

As shown in FIG. 4, the encoding apparatus and the decoding apparatus may derive a target boundary to be filtered in a reconstructed picture (step S1400).

Thereafter, the encoding apparatus and the decoding apparatus may derive a boundary strength bS (step S1410).

The bS may be determined based on two blocks that face the target boundary. For example, the bS may be determined based on the following table.

TABLE 3

The variable bS[ $xD_i$ ][ $yD_j$ ] is derived as follows:
- If cIdx is equal to 0 and both samples $p_0$ and $q_0$ are in a coding block with intra_bdpcm_flag equal to 1, bS[ $xD_i$ ][ $yD_j$ ] is set equal to 0.
- Otherwise, if the sample $p_0$ or $q_0$ is in the coding block of a coding unit coded with intra prediction mode, bS[ $xD_i$ ][ $yD_j$ ] is set equal to 2.
- Otherwise, if the block edge is also a transform block edge and the sample $p_0$ or $q_0$ is in a coding block with ciip_flag equal to 1, bS[ $xD_i$ ][ $yD_j$ ] is set equal to 2.
- Otherwise, if the block edge is also a transform block edge and the sample $p_0$ or $q_0$ is in a transform block which contains one or more non-zero transform coefficient levels, bS[ $xD_i$ ][ $yD_j$ ] is set equal to 1.
- Otherwise, if the prediction mode of the coding subblock containing the sample $p_0$ is different from the prediction mode of the coding subblock containing the sample $q_0$, bS[ $xD_i$ ][ $yD_j$ ] is set equal to 1.
- Otherwise, if cIdx is equal to 0 and one or more of the following conditions are true, bS[ $xD_i$ ][ $yD_j$ ] is set equal to 1:
  - The coding subblock containing the sample $p_0$ and the coding subblock containing the sample $q_0$ are both coded in IBC prediction mode, and the absolute difference between the horizontal or vertical component of the motion vectors used in the prediction of the two coding subblocks is greater than or equal to 4 in units of quarter luma samples.

TABLE 3-continued

- For the prediction of the coding subblock containing the sample $p_0$ different reference pictures or a different number of motion vectors are used than for the prediction of the coding subblock containing the sample $q_0$.
- One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 4 in units of quarter luma samples.
- Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.
- Two motion vectors for the same reference picture are used to predict the coding subblock containing the sample $p_0$, two motion vectors for the same reference picture are used to predict the coding subblock containing the sample $q_0$ and both of the following conditions are true:
    - The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.
    - The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.
- Otherwise, the variable bS[ $xD_i$ ][ $yD_j$ ] is set equal to 0.

Here, p and q represent samples of two blocks that face the target boundary. For example, $p_0$ may represent a sample of a left or top block that faces the target boundary, and $q_0$ may represent a sample of a right or bottom block that faces the target boundary. In the case that an edge direction of the target boundary is vertical, $p_0$ may represent a sample of a left block that faces the target boundary, and $q_0$ may represent a sample of a right block that faces the target boundary. In the case that an edge direction of the target boundary is horizontal, $p_0$ may represent a sample of a top block that faces the target boundary, and $q_0$ may represent a sample of a bottom block that faces the target boundary.

The encoding apparatus and the decoding apparatus may apply filtering based on the bS (step S1420).

In the case that the bS value is zero, filtering is not applied to the target boundary. Filtering may be performed based on a filtering strength (strong or weak) and/or a filter length.

Figure 5:
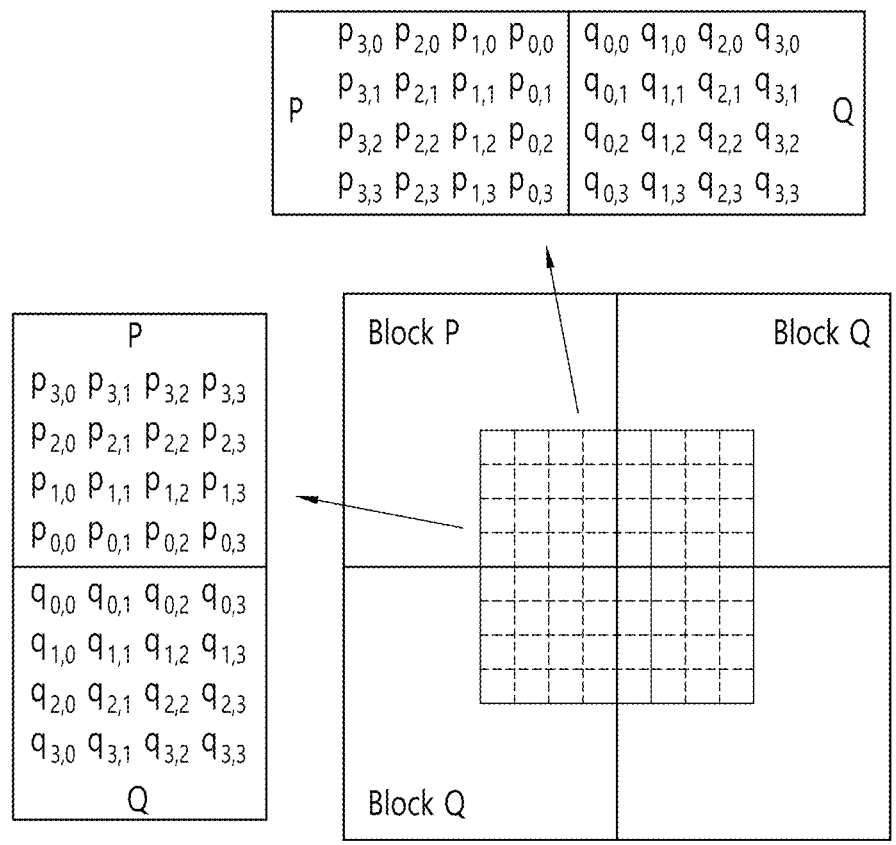
FIG. 5 is a diagram illustrating samples located at a boundary of a block.

Meanwhile, a filter strength according to a reconstructed average luma level may be derived as below. FIG. 5 is a diagram illustrating samples located at a boundary of a block.

In HEVC, a filter strength of deblocking filtering may be controlled by variables β and $t_C$ which are derived from an average quantization parameter $qP_L$. In VVC, deblocking filtering may control a strength of deblocking filtering by adding an offset to $qP_L$ according to a luma level of a reconstructed average. The reconstructed luma level LL may be derived as represented in the following equation.

$$LL = ((p_{0,0} + p_{0,3} + q_{0,0} + q_{0,3}) \gg 2)/(1 \ll bitDepth) \quad \text{[Equation 5]}$$

Here, a position of sample values pik and qix in which i is 0 to 3, and k is 0 to 3 may be identified in FIG. 5.

The variable $qP_L$ may be derived as represented in the following equation.

$$qP_L = ((Qp_Q + Qp_P + 1) \gg 1) + qpOffset \quad \text{[Equation 6]}$$

Here, $Qp_Q$ and $Qp_P$ represent quantization parameters including samples $q_{0,0}$ and $p_{0,0}$, respectively, and the offset value qpOffset that depends on a transform procedure may be signaled in a sequence parameter set (SPS).

Meanwhile, stronger filtering may be applied to a luma sample. In the case that a sample located at one side boundary belongs to a large block, a duplicated linear filter (stronger deblocking filter) may be applied. The sample that belongs to the large block may be defined as a sample that belongs to each boundary in the case that a width is equal to or greater than 32 for a vertical boundary or a height is equal to or greater than 32 for a horizontal boundary.

Meanwhile, strong filtering for a chroma sample may be performed as represented in the following equation.

$$p'_2 = (3*p_3 + 2*p_2 + p_1 + p_0 + q_0 + 4) \gg 3 \quad \text{[Equation 7]}$$
$$p'_1 = (2*p_3 + p_2 + 2*p_1 + p_0 + q_0 + q_1 + 4) \gg 3$$
$$p'_0 = (p3 + p2 + p1 + 2*p0 + q0 + q1 + q2 + 4) \gg 3$$

Chroma filtering represented in Equation 7 is performed on an 8×8 chroma sample grid. Strong filtering for a chroma sample may be performed in both sides of a block boundary. Here, chroma filtering may be selected in the case that both edges of the chroma sample are equal to or greater than 8 in a unit of chroma sample and performed in the case that a determination for the following three conditions is satisfied. First, a determination for a boundary strength (bS) and a large block, and the second and third determinations are a determination for filtering on/off and a determination for the strong filter, respectively, which are the same as the determinations for HEVC luma block, basically. An example of determining a boundary strength (bS) for a chroma block is as represented in the following table.

TABLE 4

| Conditions | Y (luma) | U (chroma) | V (chroma) |
|---|---|---|---|
| At least one of the adjacent blocks is intra | 2 | 2 | 2 |
| At least one of the adjacent blocks has non-zero transform coefficients | 1 | 1 | 1 |
| Absolute difference between the motion vectors that belong to the adjacent blocks is greater than or equal to one integer luma sample | 1 | N/A | N/A |
| Motion prediction in the adjacent blocks refers to vectors is different | 1 | N/A | N/A |
| Otherwise | 0 | 0 | 0 |

As represented in Table 4, deblocking for a chroma sample may be performing when the bS is equal to 2, or the bS is equal to 1 when a large block boundary is detected. The second and third conditions are basically the same as the strong filtering determination applied to an HEVC luma sample.

In VVC, deblocking filter may be applied for a subblock boundary, and according to an example, deblocking filter may be performed on an 8×8 grid. The deblocking filtering process may be applied to a CU boundary as well as the subblock boundary, which are aligned with an 8×8 grid.

The subblock boundary may include the prediction unit (PU) boundary introduced by a subblock-based temporal motion vector prediction (STMVP) and an affine mode, and the transform unit (TU) boundary introduced by a subblock transform (SBT) and an ISP (intra subpartitions) mode.

For a subblock on an 8×8 grid to which the SBT or the ISP are applied, the same procedure as the procedure applied in a TU deblocking filter of HEVC is applied. Deblocking filtering is applied to a TU boundary on an 8×8 grid when there are non-zero coefficients in either one of subblock across an edge.

For a subblock on an 8×8 grid to which the STMVP and affine modes are applied, the same procedure as the procedure applied in a TU deblocking filter of HEVC is applied. Deblocking filtering is applied to a PU boundary on an 8×8 grid with the consideration of the difference between motion vectors and reference pictures of a neighboring subblock.

Hereinafter, among the in-loop filtering process for a block to which the BDPCM is applied, a deblocking filtering method may be proposed. In an example, in the process of encoding and decoding an image or a video, in the case that a luma block is coded in the BDPCM a single tree type, a boundary strength (bS) of a corresponding chroma block may be set as the same as the luma block. That is, in the case that a tree type is the single tree, in order to determine whether deblocking filtering is applied to a block coded in the BDPCM, when the bS is calculated, the bS for the chroma block may be determined as below.

Figure 6:
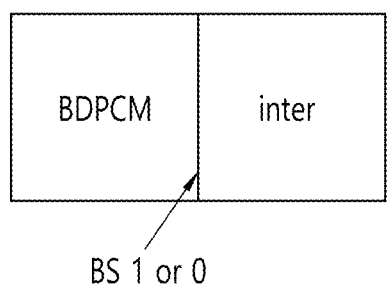
FIG. 6 is a diagram illustrating a method for determining a bS according to an embodiment of the present disclosure.
Figure 6:
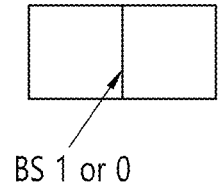
Figure 6:
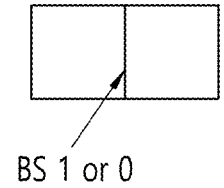
Figure 6:
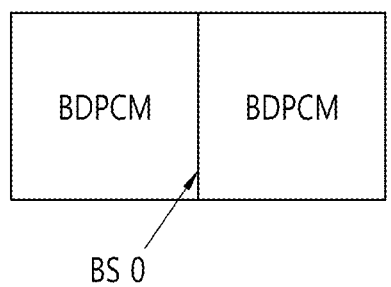
Figure 6:
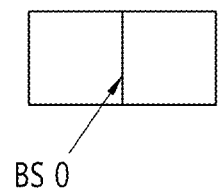
Figure 6:
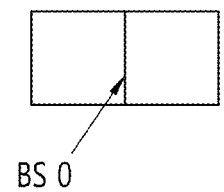
Figure 6:
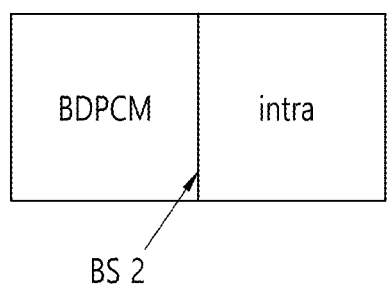
Figure 6:
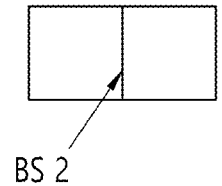
Figure 6:
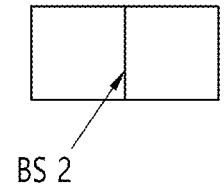

FIG. 6 is a diagram illustrating a method for determining a bS according to an embodiment of the present disclosure.

According to an example, in the case that two blocks are BDPCM coded based on an edge, a bS may be derived as zero. That is, for a chroma block, without regard to whether the BDPCM is applied, in the case that a corresponding luma block is BDPCM coded, the bS of the chroma block may be derived as zero in the single tree type.

In FIG. 6, the large block in the left side may represent a luma block, and the small blocks in the right side may represent chroma blocks according to components (Cb and Cr).

As shown in FIG. 6, the bS in a block boundary may be determined according to a coding scheme of two neighboring luma blocks, and the bS of the chroma block may be set as the same as the bS of the luma block.

The two neighboring luma blocks shown in the top side may be coded according to the BDPCM and the inter prediction, respectively, and in this case, the bS may be set to 1 or 0. In addition, the two neighboring luma blocks shown in the bottom side may be coded according to the BDPCM and the intra prediction, respectively, and in this case, the bS may also be set to 1 or 0. In both two cases, the bS of the chroma block may be set as the same as the bS of the luma block.

In addition, in the case that both two neighboring luma blocks are coded in the BDPCM like the luma blocks shown in the middle, the bS for a boundary of the two blocks may be set to zero, and in this case, for the chroma block corresponding to the luma block, the bS for deblocking filtering may also be set to zero.

Whether the luma block is coded in the BDPCM scheme may be signaled with flag information such as intra_bdpcm_flag represented in Table 1.

As such, in the case that the bS is set to zero, deblocking filtering is not performed. That is, in the case that both two neighboring luma blocks are coded in the BDPCM scheme according to an embodiment, the bSs of the luma block and the chroma block are set to zero, and deblocking filtering is not performed.

Such a bS determination method is as represented in the following table.

TABLE 5

| 1.1.1.1 Derivation process of boundary filtering strength |
|---|
| Inputs to this process are:     a picture sample array recPicture,     a location ( xCb, yCb ) specifying the top-left sample of the current coding block       relative to the top-left sample of the current picture.     a variable nCbW specifying the width of the current coding block,     a variable nCbH specifying the height of the current coding block,     a variable edgeType specifying whether a vertical (EDGE_VER) or a horizontal       (EDGE_HOR) edge is filtered,     a variable cIdx specifying the colour component of the current coding block,     a two-dimensional (nCbW)×(nCbH) array edgeFlags. Output of this process is a two-dimensional (nCbW)×(nCbH) array bS specifying the boundary filtering strength. |

TABLE 5-continued 1.1.1.1 Derivation process of boundary filtering strength

The variables $xD_i$, $yD_j$, xN and yN are derived as follows:
  If edgeType is equal to EDGE_VER,
    $xD_i$ = ( i << 3 )  (8-1026)
    $yD_j$ = cIdx = = 0  ?  ( j << 2 )  :
    ( j << 1 )  (8-1027)
    xN is set equal to Max( 0, ( nCbW / 8 ) − 1 )  (8-1028)
    yN = cIdx = = 0  ?  ( nCbH / 4 ) − 1  :  ( nCbH / 2 ) − 1  (8-1029)
  Otherwise (edgeType is equal to EDGE_HOR)
    $xD_i$ = cIdx = = 0  ?  ( i << 2 ) :
    ( i << 1 )  (8-1030)
    $yD_j$ = ( j << 3 )  (8-1031)
    xN = cIdx = = 0  ?  ( nCbW / 4 ) − 1  :  ( nCbW / 2 ) − 1  (8-1032)
    yN = Max( 0, ( nCbH / 8 ) − 1 )  (8-1033)
  For $xD_i$ with i = 0..xN and $yD_j$ with j = 0..yN, the following applies:
    If edgeFlags[ $xD_i$ ][ $yD_j$ ] is equal to 0, the variable bS[ $xD_i$ ][ $yD_j$ ] is set equal to 0.
    Otherwise, the following applies:
      The sample values $p_0$ and $q_0$ are derived as follows:
        If edgeType is equal to EDGE_VER, $p_0$ is set equal to
          recPicture[ xCb + $xD_i$ − 1 ][ yCb + $yD_j$ ] and $q_0$ is set equal to
          recPicture[ xCb + $xD_i$ ][ yCb + $yD_j$ ]
        Otherwise (edgeType is equal to EDGE_HOR), $p_0$ is set equal to
          recPicture[ xCb + $xD_i$ ][ yCb + $yD_j$ − 1 ] and $q_0$ is set equal to
          recPicture[ xCb + $xD_i$ ][ yCb + $yD_j$ ]
      The variable bS[ $xD_i$ ][ $yD_j$ ] is derived as follows:
        If both samples $p_0$ and $q_0$ are in a coding block with intra_bdpcm_flag equal
          to 1, bS[ $xD_i$ ][ $yD_j$ ] is set equal to 0.
        Otherwise, if the sample $p_0$ or $q_0$ is in the coding block of a coding unit
          coded with intra prediction mode, bS[ $xD_i$ ][ $yD_j$ ] is set equal to 2.
        Otherwise, if the block edge is also a transform block edge and the sample $p_0$
          or $q_0$ is in a coding block with ciip_flag equal to 1, bS[ $xD_i$ ][ $yD_j$ ] is set equal
          to 2.
        Otherwise, if the block edge is also a transform block edge and the sample $p_0$ or
          $q_0$ is in a transform block which contains one or more non-zero transform
          coefficient levels, bS[ $xD_i$ ][ $yD_j$ ] is set equal to 1.
        Otherwise, if the prediction mode of the coding subblock containing the sample
          $p_0$ is different from the prediction mode of the coding subblock containing the
          sample $q_0$, bS[ $xD_i$ ][ $yD_j$ ] is set equal to 1.
        Otherwise, if cIdx is equal to 0 and one or more of the following conditions are
          true, bS[ $xD_i$ ][ $yD_j$ ] is set equal to 1:
      The coding subblock containing the sample $p_0$ and the coding subblock
        containing the sample $q_0$ are both coded in IBC prediction mode, and the
        absolute difference between the horizontal or vertical component of the motion
        vectors used in the prediction of the two coding subblocks is greater than or
        equal to 4 in units of quarter luma samples.
      For the prediction of the coding subblock containing the sample $p_0$ different
        reference pictures or a different number of motion vectors are used than for the
        prediction of the coding subblock containing the sample $q_0$.
      One motion vector is used to predict the coding subblock containing the sample
        $p_0$ and one motion vector is used to predict the coding subblock containing the
        sample $q_0$, and the absolute difference between the horizontal or vertical
        component of the motion vectors used is greater than or equal to 4 in units of
        quarter luma samples.
      Two motion vectors and two different reference pictures are used to predict the
        coding subblock containing the sample $p_0$, two motion vectors for the same two
        reference pictures are used to predict the coding subblock containing the sample
        $q_0$ and the absolute difference between the horizontal or vertical component of
        the two motion vectors used in the prediction of the two coding subblocks for the
        same reference picture is greater than or equal to 4 in units of quarter luma
        samples.
      Two motion vectors for the same reference picture are used to predict the coding
        subblock containing the sample p0 two motion vectors for the same reference
        picture are used to predict the coding subblock containing the sample q0 and
        both of the following conditions are true:
      The absolute difference between the horizontal or vertical component of list 0
        motion vectors used in the prediction of the two coding subblocks is greater than
        or equal to 4 in quarter luma samples, or the absolute difference between the
        horizontal or vertical component of the list 1 motion vectors used in the
        prediction of the two coding subblocks is greater than or equal to 4 in units of
        quarter luma samples.
      The absolute difference between the horizontal or vertical component of list 0
        motion vector used in the prediction of the coding subblock containing the
        sample $p_0$ and the list 1 motion vector used in the prediction of the coding
        subblock containing the sample $q_0$ is greater than or equal to 4 in units of quarter
        luma samples, or the absolute difference between the horizontal or vertical TABLE 5-continued 1.1.1.1 Derivation process of boundary filtering strength component of the list 1 motion vector used in the prediction of the coding
subblock containing the sample $p_0$ and list 0 motion vector used in the prediction
of the coding subblock containing the sample $q_0$ is greater than or equal to 4 in
units of quarter luma samples.
  Otherwise, the variable bS[ $xD_i$ ][ $yD_j$ ] is set equal to 0.

NOTE 1
The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different.
NOTE 2
The number of motion vectors that are used for the prediction of a coding subblock with top-left sample covering ( xSb, ySb ) is equal to PredFlagL0[ xSb ][ ySb ] + PredFlagL1[ xSb ][ ySb ].

In Table 5, as described above, in the case that a target boundary is a vertical boundary, based on the target boundary, a left block may be indicated as P, and a right block may be indicated as Q. Further, in the case that a target boundary is a horizontal boundary, based on the target boundary, a top block may be indicated as P, and a bottom block may be indicated as Q.

The variable bS[xDi][yDj] for the bS may be derived as one of 0, 1, and 2.

As represented in Table 5, in the case that both samples $p_0$ and $q_0$ are in a coding block with intra_bdpcm_flag equal to 1, bS[xDi][yDj] is set equal to 0. In this case, deblocking filtering is not performed.

Otherwise, in the case that the sample $p_0$ or $q_0$ is in the coding block of a coding unit coded with the intra prediction mode, bS[xDi][yDj] is set equal to 2.

In addition, in the case that the block edge is also a transform block edge and the sample $p_0$ or $q_0$ is in a transform block which contains one or more non-zero transform coefficient levels, bS[xDi][yDj] is set equal to 1.

Alternatively, in the case that two blocks are coded with different prediction modes or different reference picture or different number of motion vectors are used, bS[xDi][yDj] may be set equal to 1.

Meanwhile, according to another example, bdpcm flag information may be signaled as represented in the following table.

TABLE 6

7.3.2.3 Sequence parameter set RBSP syntax

| | |
|---|---|
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |

7.4.3.3 Sequence parameter set RBSP semantics sps_bdpcm_enabled_flag equal to 1 specifies that intra_bdpcm_luma_flag and intra_bdpcm_chroma_flag may be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0.

Table 6 represents "sps_bdpcm_enabled_flag" signaled in a sequence parameter set (SPS). In the case that the syntax element "sps_bdpcm_enabled_flag" is 1, the case represents that the flag information representing whether the BDPCM is applied to a coding unit for which the intra prediction is performed, that is, intra_bdpcm_luma_flag" and "intra_bdpcm_chroma_flag" are present in the coding unit.

In the case that the syntax element "sps_bdpcm_enabled_flag" is not present, the value is regarded as zero.

TABLE 7

7.3.10.5 Coding unit syntax

| | |
|---|---|
| if( sps_bdpcm_enabled_flag && | |
|     cbWidth <= MaxTsSize && cbHeight <= MaxTsSize ) | |
|   intra_bdpcm_luma_flag | ae(v) |
|   if( intra_bdpcm_luma_flag ) | |
|     intra_bdpcm_luma_dir_flag | ae(v) |
| if( ( treeType = = SINGLE_TREE \| \| treeType = = DUAL_TREE_CHROMA ) && | |
|   ChromaArrayType != 0 ) { | |
|   if( pred_mode_plt_flag && treeType = = DUAL_TREE_CHROMA ) | |
|     palette_coding( x0, y0, cbWidth / SubWidthC, cbHeight / SubHeightC, treeType ) | |
|   else if( !pred_mode_plt_flag ) { | |
|     if( !cu_act_enabled_flag ) { | |
|       if( cbWidth / SubWithC <= MaxTsSize && cbHeight / SubHeigth <= MaxTsSize | |
|         && sps_bdpcm_enabled_flag | |
|         intra_bdpcm_chroma_flag | ae(v) |
|       if( intra_bdpcm_chroma_flag ) | |
|         intra_bdpcm_chroma_dir_flag | ae(v) |

7.4.11.5 Coding unit semantics intra_bdpcm_luma_flag equal to 1 specifies that BDPCM is applied to the current luma coding block at the location ( x0, y0 ), i.e. the transform is skipped, the intra luma prediction mode is specified by intra_bdpcm_luma_dir_flag. intra_bdpcm_luma_flag equal to 0 specifies that BDPCM is not applied to the current luma coding block at the location ( x0, y0 ).
When intra_bdpcm_luma_flag is not present it is inferred to be equal to 0.

TABLE 7-continued

The variable BdpcmFlag[ x ][ y ][ cIdx ] is set equal to intra_bdpcm_luma_flag for
x = x0..x0 + cbWidth − 1, y = y0..y0 + cbHeight − 1 and cIdx = 0.
intra_bdpcm_luma_dir_flag equal to 0 specifies that the BDPCM prediction direction is
horizontal. intra_bdpcm_luma_dir_flag equal to 1 specifies that the BDPCM prediction
direction is vertical. The variable BdpcmDir[ x ][ y ][ cIdx ] is set equal to
intra_bdpcm_luma_dir_flag for x = x0..x0 + cbWidth − 1, y = y0..y0 + cbHeight − 1 and
cIdx = 0.
intra_bdpcm_chroma_flag equal to 1 specifies that BDPCM is applied to the current chroma
coding blocks at the location ( x0, y0 ), i.e the transform is skipped, the intra chroma prediction
mode is specified by intra_bdpcm_chroma_dir_flag, intra_bdpcm_chroma_flag equal to 0
specifies that BDPCM is not applied to the current chroma coding blocks at the location ( x0, y0 ).
When intra_bdpcm_chroma_flag is not present it is inferred to be equal to 0.
The variable BdpcmFlag[ x ][ y ][ cIdx ] is set equal to intra_bdpcm_chroma_flag for
x = x0..x0 + cbWidth − 1, y = y0..y0 + cbHeight − 1 and cIdx = 1..2.
intra_bdpcm_chroma_dir_flag equal to 0 specifies that the BDPCM prediction direction is
horizontal, intra_bdpcm_chroma_dir_flag equal to 1 specifies that the BDPCM prediction
direction is vertical.
The variable BdpcmDir[ x ][ y ][ cIdx ] is set equal to intra_bdpcm_chroma_dir_flag for
x = x0..x0 + cbWidth − 1, y = y0..y0 + cbHeight − 1 and cIdx = 1..2.

The syntax element "intra_bdpcm_luma_flag" and "intra_bdpcm_chroma_flag" represented in Table 6 represents whether the BDPCM is applied to a current luma coding block or a current chroma coding block. In the case that "intra_bdpcm_luma_flag" or "intra_bdpcm_chroma_flag" is 1, the transform for the coding block may be skipped, and a prediction mode for the coding block may be set in a horizontal or vertical direction by "intra_bdpcm_luma_dir_flag" or "intra_bdpcm_chroma_dir_flag" that represents a prediction direction. In the case that "intra_bdpcm_luma_flag" or "intra_bdpcm_chroma_flag" is not present, the value is regarded as zero.

"intra_bdpcm_chroma_flag" may be signaled for a chroma coding block of which a current block is a single tree type or a dual tree chroma.

In the case that "intra_bdpcm_luma_dir_flag" or "intra_bdpcm_chroma_dir_flag" that represents a prediction direction is zero, the case represents that a BDPCM prediction direction is a horizontal direction, and in the case that "intra_bdpcm_luma_dir_flag" or "intra_bdpcm_chroma_dir_flag" value is 1, the case represents that a BDPCM prediction direction is a vertical direction.

A bS determination method according to the flag information represented in Table 6 and Table 7 is represented as below.

As represented in Table 8, according to an example, whether two neighboring luma blocks are coded in the BDPCM may be indicated by intra_bdpcm_luma_flag. In the case that intra_bdpcm_luma_flag value is 1, bS[xDi][yDj] for a luma block may be set to zero.

In addition, whether two neighboring chroma blocks are coded in the BDPCM may be indicated by intra_bdpcm_chroma_flag. In the case that intra_bdpcm_chroma_flag is 1, bS[xDi][yDj] for a luma block may be set to zero.

That is, the flag information for the BDPCM may be signaled for each of the luma block and the chroma block, and in the case that the flag value is 1, the bS for deblocking filtering may be set to zero. That is, for the block coded in the BDPCM scheme, deblocking filtering may not be performed.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 7:
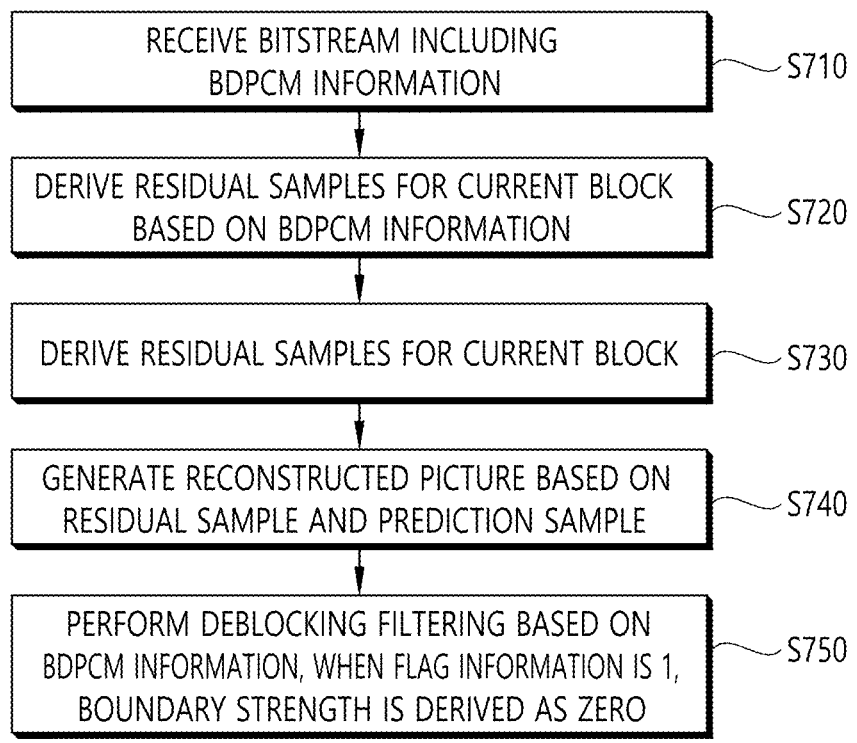
FIG. 7 is a control flowchart for describing a video decoding method according to an embodiment of the present disclosure.

FIG. 7 is a control flowchart for describing a video decoding method according to an embodiment of the present disclosure.

TABLE 8

For $xD_i$ with i = 0..xN and $yD_j$ with j = 0..yN, the following applies:
  If edgeFlags[ $xD_i$ ][ $yD_j$ ] is equal to 0, the variable bS[ $xD_i$ ][ $yD_j$ ] is set equal to 0.
  Otherwise, if edgeType is equal to EDGE_VER, VirtualBoundariesPresentFlag equal to 1, and ( xCb + $xD_i$ ) is
  equal to VirtualBoundariesPosX[ n ] for any n = 0..NumVerVirtualBoundaries − 1, the variable bS[ $xD_i$ ][ $yD_j$ ]
  is set equal to 0.
  Otherwise, if edgeType is equal to EDGE_HOR, VirtualBoundariesPresentFlag equal to 1, and ( yCb + $yD_j$ ) is
  equal to VirtualBoundariesPosY[ n ] for any n = 0..NumHorVirtualBoundaries − 1, the variable bS[ $xD_i$ ][ $yD_j$ ]
  is set equal to 0.
  Otherwise, the following applies:
    The sample values $p_0$ and $q_0$ are derived as follows:
      If edgeType is equal to EDGE_VER, $p_0$ is set equal to recPicture[ xCb + $xD_i$ − 1 ][ yCb + $yD_j$ ] and $q_0$
      is set equal to recPicture[ xCb + $xD_i$ ][ yCb + $yD_j$ ].
      Otherwise (edgeType is equal to EDGE_HOR) $p_0$ is set equal to
      recPicture[ xCb + $xD_i$ ][ yCb + $yD_j$ − 1 ] and $q_0$ is set equal to recPicture[ xCb + $xD_i$ ][ yCb + $yD_j$ ].
    The variable bS[ $xD_i$ ][ $yD_j$ ] is derived as follows:
      If cIdx is equal to 0 and both samples $p_0$ and $q_0$ are in a coding block with intra_bdpcm_luma_flag
      equal to 1, bS[ $xD_i$ ][ $yD_j$ ] is set equal to 0.
      Otherwise, if cIdx is greater than 0 and both samples $p_0$ and $q_0$ are in a coding block with
      intra_bdpcm_chroma_flag equal to 1, bS[ $xD_i$ ][ $yD_j$ ] is set equal to 0.
      Otherwise, if the sample $p_0$ or $q_0$ is in the coding block of a coding unit coded with CuPredMode equal
      to MODE_INTRA, bS[ $xD_i$ ][ $yD_j$ ] is set equal to 2.
      Otherwise, if the block edge is also a coding block edge and the sample $p_0$ or $q_0$ is in a coding block
      with ciip_flag equal to 1, bS[ $xD_i$ ][ $yD_j$ ] is set equal to 2.

The decoding apparatus 300 receives coding information such as BDPCM information from a bitstream (step S710).

The BDPCM information may include BDPCM flag information that indicates whether the BDPCM is applied to a current block and directional information for a direction in which the BDPCM is performed.

When the BDPCM is applied to the current block, the BDPCM flag value may be 1, and when the BDPCM is not applied to the current block, the BDPCM flag value may be zero.

Meanwhile, a tree type of the current block may be classified into a single tree SINGLE_TREE or a dual tree DUAL_TREE according to whether a chroma block corresponding to a luma block has an individual partition structure. In the case that a chroma block has the same partition structure as a luma block, the case may represent the single tree, and in the case that a chroma component block has a different partition structure from a luma component block, the case may represent the dual tree. According to an example, the BDPCM may be individually applied to a luma block or a chroma block of the current block. When the BDPCM is applied to a luma block, a transform index for the luma block may not be received, and when the BDPCM is applied to a chroma block, a transform index for the chroma block may not be received.

In the case that a tree structure of the current block is the dual tree, the BDPCM may be applied to only one component block, and even in the case that the current block is the single tree structure, the BDPCM may be applied to only one component block.

Meanwhile, the directional information for the BDPCM may indicate a horizontal direction or a vertical direction. According to the directional information, quantization information may be derived, and a prediction sample may be derived.

The decoding apparatus 300 may derive a quantized transform coefficient for the current block, that is, untransformed quantized residual samples based on the BDPCM and derive a residual sample by performing dequantization for the quantized residual samples (step S720).

In the case the BDPCM is applied to the current block, the residual information received in the decoding apparatus 300 may a differential value of the quantized residuals. According to a BDPCM direction, a differential value of quantized residuals of a line of a previous vertical or horizontal direction and a specific line may be received, and the decoding apparatus 300 may add the quantized residuals of a line of a previous vertical or horizontal direction to the received differential value of quantized residuals and derive a quantized residual of a specific line. The quantized residual may be derived based on Equation 3 or Equation 4.

As described above, when the BDPCM is applied to the current block, a dequantized transform coefficient may be derived as a residual sample without going through a transform procedure.

The intra predictor 331 may perform an intra prediction for the current block based on the BDPCM information, that is, the directional information in which the BDPCM is performed and derive prediction samples (step S730).

When the BDPCM is applied to the current block, an intra prediction may be performed using the BDPCM, and this may mean that the BDPCM may be applied only to an intra slice or intra coding block predicted in the intra mode.

The intra prediction may be performed based on the directional information for the BDPCM, and the intra prediction mode of the current block may be either one of a horizontal directional mode or a vertical directional mode.

The decoding apparatus 300 may generate a reconstructed picture based on the derived residual sample and the prediction sample (step S740).

The decoding apparatus 300 may perform deblocking filtering, which is one of in-loop filtering methods based on the BDPCM information, for the reconstructed picture (step S750). In this case, when BDPCM flag information is 1, the boundary strength (bS) is derived as zero, and deblocking filtering may not be performed.

According to an example, in the case that a luma block is coded in the BDPCM in the single tree type, the boundary strength (bS) of a corresponding chroma block may be set as the same as the luma block.

In the case that two blocks are BDPCM coded based on an edge between blocks, the bS may be derived as zero. That is, for a chroma block, without regard to whether the BDPCM is applied, in the case that a corresponding luma block is BDPCM coded, the bS of the chroma block may be derived as zero in the single tree type.

As such, in the case that the bS is set to zero, deblocking filtering is not performed. That is, in the case that both two neighboring luma blocks are coded in the BDPCM scheme according to an embodiment, the bSs of the luma block and the chroma block are set to zero, and deblocking filtering is not performed.

Alternatively, according to another example, whether two neighboring luma blocks are coded in the BDPCM may be indicated by intra_bdpcm_luma_flag. In the case that intra_bdpcm_luma_flag value is 1, bS[xDi][yDj] for a luma block may be set to zero. In addition, whether two neighboring chroma blocks are coded in the BDPCM may be indicated by intra_bdpcm_chroma_flag. In the case that intra_bdpcm_chroma_flag is 1, bS[xDi][yDj] for a luma block may be set to zero.

That is, the flag information for the BDPCM may be signaled for each of the luma block and the chroma block, and in the case that the flag value is 1, the bS for deblocking filtering may be set to zero. That is, for the block coded in the BDPCM scheme, deblocking filtering may not be performed.

In summary, the BDPCM information received in the decoding apparatus may include flag information indicating whether the BDPCM is applied to the current block, and when the flag information is 1, the boundary strength (bS) for deblocking filtering may be derived as zero.

In this case, the current block may be either one of a luma coding block or a chroma coding block, and in the case that a tree type of the current block is the single tree type and a chroma coding block, when the flag information is 1, the boundary strength may be derived as 1.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 8:
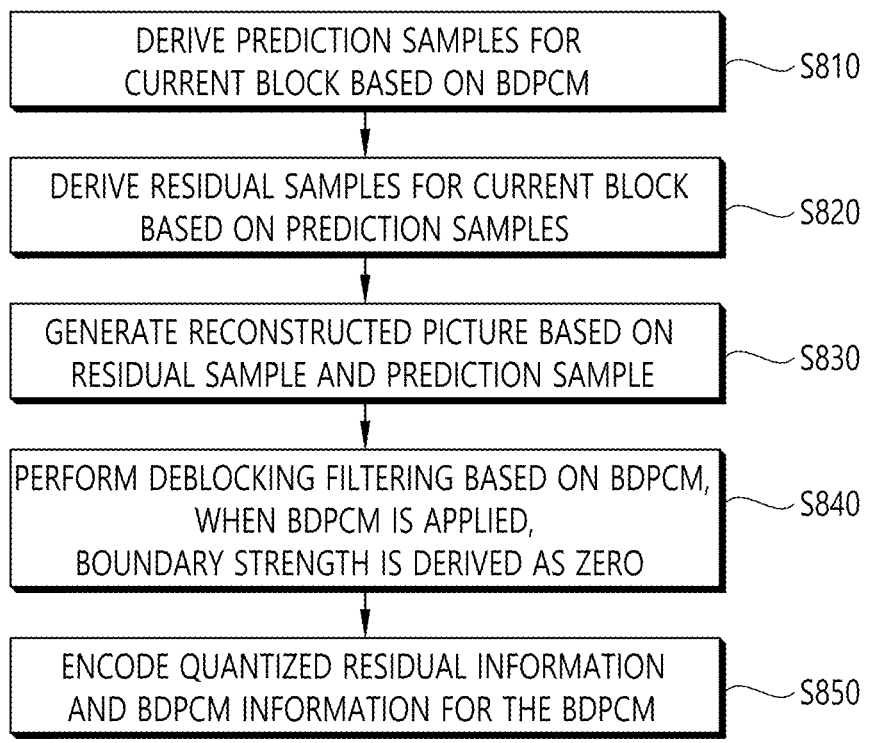
FIG. 8 is a control flowchart for describing a video encoding method according to an embodiment of the present disclosure.

FIG. 8 is a control flowchart for describing a video encoding method according to an embodiment of the present disclosure.

The encoding apparatus 200 may derive prediction samples for a current block based on the BDPCM (step S810).

The encoding apparatus 200 may derive an intra prediction sample for the current block based on a specific direction in which the BDPCM is performed. The specific direction may be a vertical direction or a horizontal direction, and according to the intra prediction mode, a prediction sample for the current block may be generated.

Meanwhile, a tree type of the current block may be classified into a single tree SINGLE_TREE or a dual tree DUAL_TREE according to whether a chroma block corresponding to a luma block has an individual partition structure. In the case that a chroma block has the same partition structure as a luma block, the case may represent the single tree, and in the case that a chroma component block has a different partition structure from a luma component block, the case may represent the dual tree. According to an example, the BDPCM may be individually applied to a luma block or a chroma block of the current block.

In the case that a tree structure of the current block is the dual tree, the BDPCM may be applied to only one component block, and even in the case that the current block is the single tree structure, the BDPCM may be applied to only one component block.

Alternatively, according to an example, the BDPCM may be applied only in the case that a width of the current block is a first threshold value or smaller and a height of the current block is a second threshold value or smaller. The first threshold value and the second threshold value may be 32 and set to a maximum height or a maximum width of a transform block in which transform is performed.

The encoding apparatus 200 may derive residual samples for the current block based on a prediction block (step S820) and generate a reconstructed picture based on the residual sample and the prediction sample (step S830).

The encoding apparatus 200 may perform deblocking filtering, which is one of in-loop filtering methods based on the BDPCM information, for the reconstructed picture (step S840). In this case, when BDPCM flag information is 1, the boundary strength (bS) is derived as zero, and deblocking filtering may not be performed.

According to an example, in the case that a luma block is coded in the BDPCM in the single tree type, the boundary strength (bS) of a corresponding chroma block may be set as the same as the luma block.

In the case that two blocks are BDPCM coded based on an edge between blocks, the bS may be derived as zero. That is, for a chroma block, without regard to whether the BDPCM is applied, in the case that a corresponding luma block is BDPCM coded, the bS of the chroma block may be derived as zero in the single tree type.

As such, in the case that the bS is set to zero, deblocking filtering is not performed. That is, in the case that both two neighboring luma blocks are coded in the BDPCM scheme according to an embodiment, the bSs of the luma block and the chroma block are set to zero, and deblocking filtering is not performed.

Alternatively, according to another example, according to whether two luma blocks are coded in the BDPCM, bS[xDi][yDj] for a luma block may be derived as zero, and according to whether two chroma blocks are coded in the BDPCM, bS[xDi][yDj] for a chroma block may be derived as zero.

In addition, the flag information for the BDPCM may be coded for each of the luma block and the chroma block, and in the case that the flag value is 1, the bS for deblocking filtering may be set to zero. That is, for the block coded in the BDPCM scheme, deblocking filtering may not be performed.

Thereafter, the encoding apparatus 200 may derive quantized residual information based on the BDPCM.

The encoding apparatus 200 may derive a quantized residual sample of a specific line and a differential value of a quantized residual sample of a line of a previous vertical or horizontal direction and a specific line as the quantized residual information. That is, a differential value of a quantized residual, not the conventional residual, is generated as the residual information, which may be derived based on Equation 1 or Equation 2.

The encoding apparatus 200 may encode the quantized residual information and coding information for the current block, for example, the BDPCM information for the BDPCM (step S850).

The BDPCM information may include BDPCM flag information that indicates whether the BDPCM is applied to a current block and directional information for a direction in which the BDPCM is performed.

When the BDPCM is applied to the current block, the BDPCM flag value may be encoded to 1, and when the BDPCM is not applied to the current block, the BDPCM flag value may be encoded to zero.

In addition, as described above, in the case that a tree structure of the current block is the dual tree, the BDPCM may be applied to only one component block, and even in the case that the current block is the single tree structure, the BDPCM may be applied to only one component block.

The directional information for the BDPCM may indicate a horizontal direction or a vertical direction.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

In addition, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 9:
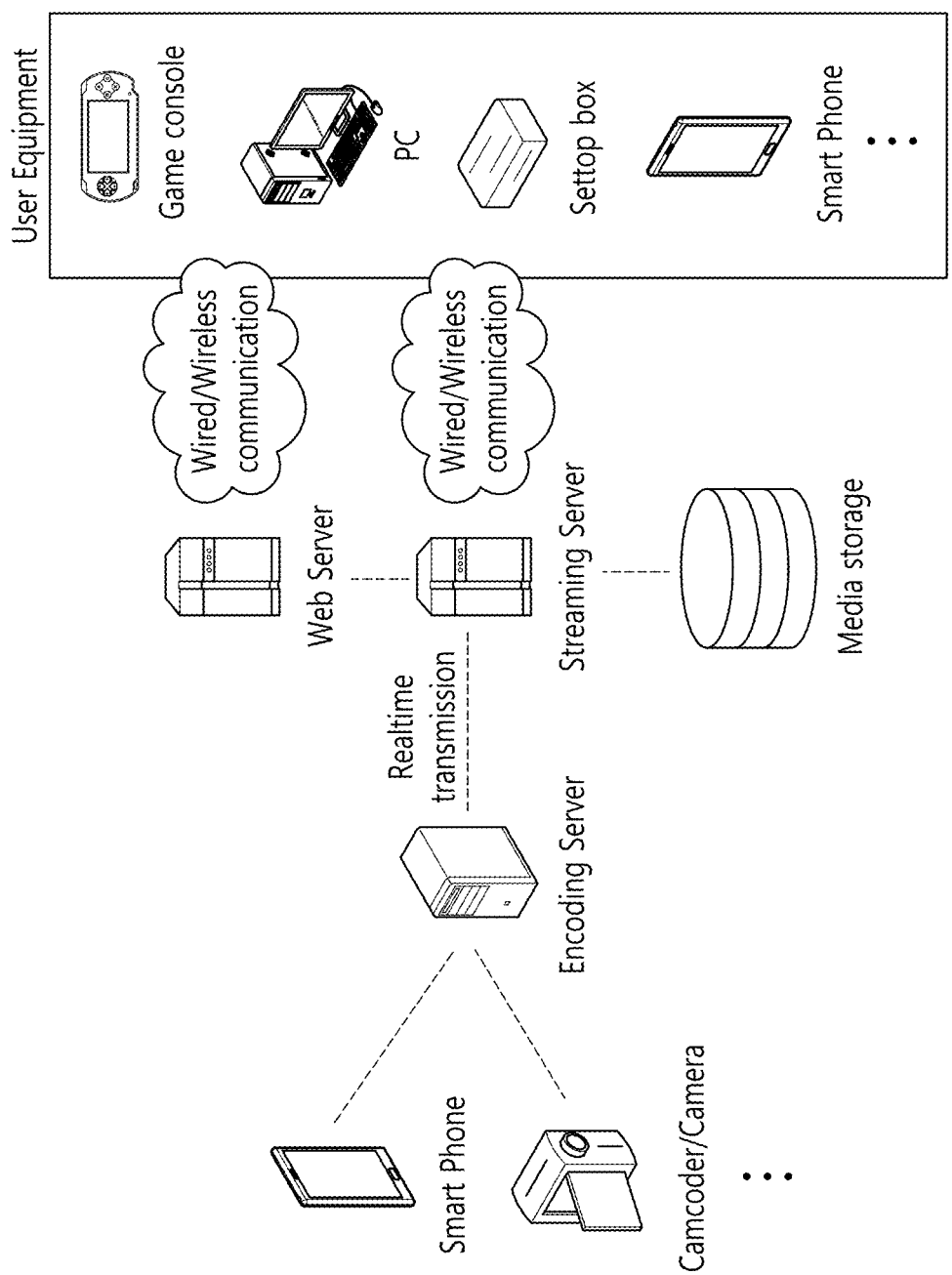
FIG. 9 illustrates the structure of a content streaming system to which the present disclosure is applied.

FIG. 9 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. A decoding apparatus for video decoding, the decoding apparatus comprising:
a memory; and
at least one processor coupled with the memory,
wherein the at least one processor is configured to:
obtain Block-based Delta Pulse Code Modulation (BDPCM) flag information from a bitstream;
derive quantized transform coefficients for a current block based on the BDPCM flag information;
derive residual samples for the current block by performing a dequantization for the quantized transform coefficients;
derive prediction samples for the current block based on the BDPCM flag information;
generate a reconstructed picture based on the residual samples and the prediction samples;
derive a boundary strength (bS) for a target boundary of the current block in the reconstructed picture;
determine whether deblocking filtering is applied to the target boundary based on the bS; and perform the deblocking filtering on the reconstructed picture based on a result of the determination, wherein the bS for the target boundary is derived based on the BDPCM flag information, wherein a tree type of the current block is a single tree type, and the current block is a chroma coding block, and wherein based on a value of the BDPCM flag information being 1, the bS for the target boundary of the chroma coding block is derived as 0.

2. The apparatus of claim 1, wherein the BDPCM flag information is related to whether a BDPCM is applied to the current block, wherein based on the BDPCM being applied to the current block, the value of the BDPCM flag information is 1, and wherein based on the BDPCM being not applied to the current block, the value of the BDPCM flag information is 0.

3. The apparatus of claim 1, wherein based on the bS for the target boundary being 0, the deblocking filtering is not applied to the target boundary.

4. The apparatus of claim 1, wherein the quantized transform coefficient is derived based on directional information for a direction in which the BDPCM is performed.

5. The apparatus of claim 1, wherein an intra prediction sample for the current block is derived based on a direction in which the BDPCM is performed.

6. An encoding apparatus for video encoding, the encoding apparatus comprising:
a memory; and
at least one processor coupled with the memory,
wherein the at least one processor is configured to:
derive prediction samples for a current block based on a Block-based Delta Pulse Code Modulation (BDPCM);
derive residual samples for the current block based on the prediction samples;
generate a reconstructed picture based on the residual samples and the prediction samples;
derive a boundary strength (bS) for a target boundary of the current block in the reconstructed picture;
determine whether deblocking filtering is applied to the target boundary based on the bS;
perform the deblocking filtering on the reconstructed picture based on a result of the determination;
generate quantized residual information by performing a quantization for the residual samples based on the BDPCM; and
encode the quantized residual information and BDPCM flag information for the BDPCM,
wherein the bS for the target boundary is derived based on the BDPCM flag information, wherein a tree type of the current block is a single tree type, and the current block is a chroma coding block, and wherein based on a value of the BDPCM flag information being 1, the bS for the target boundary of the chroma coding block is derived as 0.

7. The apparatus of claim 6, wherein the BDPCM flag information is related to whether the BDPCM is applied to the current block, wherein based on the BDPCM being applied to the current block, the value of the BDPCM flag information is 1, and wherein based on the BDPCM being not applied to the current block, the value of the BDPCM flag information is 0.

8. The apparatus of claim 6, wherein based on the bS for the target boundary being 0, the deblocking filtering is not applied to the target boundary.

9. The apparatus of claim 6, wherein an intra prediction sample for the current block is derived based on a specific direction in which the BDPCM is performed, and wherein the quantization for the residual samples is performed based on the specific direction.

10. An apparatus for transmitting data for a video, the apparatus comprising:
at least one processor configured to obtain a bitstream for the video, wherein the bitstream is generated based on deriving prediction samples for a current block based on a Block-based Delta Pulse Code Modulation (BDPCM), deriving residual samples for the current block based on the prediction samples, generating a reconstructed picture based on the residual samples and the prediction samples, deriving a boundary strength (bS) for a target boundary of the current block in the reconstructed picture, determining whether deblocking filtering is applied to the target boundary based on the bS, performing the deblocking filtering on the reconstructed picture based on a result of the determination, generating quantized residual information by performing a quantization for the residual samples based on the BDPCM, and encoding the quantized residual information and BDPCM flag information for the BDPCM; and
a transmitter configured to transmit the data comprising the bitstream,
wherein the bS for the target boundary is derived based on the BDPCM flag information, wherein a tree type of the current block is a single tree type, and the current block is a chroma coding block, and wherein based on a value of the BDPCM flag information being 1, the bS for the target boundary of the chroma coding block is derived as 0.

* * * * *